(12) United States Patent
Lee et al.

(10) Patent No.: US 8,568,920 B2
(45) Date of Patent: Oct. 29, 2013

(54) ELECTROLYTIC SOLUTION AND LITHIUM BATTERY EMPLOYING THE SAME

(75) Inventors: Dong-joon Lee, Yongin-si (KR); Young-gyoon Ryu, Yongin-si (KR); Dong-min Im, Yongin-si (KR); Seok-soo Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 622 days.

(21) Appl. No.: 12/775,940

(22) Filed: May 7, 2010

(65) Prior Publication Data

US 2010/0285374 A1  Nov. 11, 2010

(30) Foreign Application Priority Data

May 8, 2009  (KR) .................. 10-2009-0040295

(51) Int. Cl.
*H01M 6/04* (2006.01)

(52) U.S. Cl.
USPC ........... 429/188; 429/304; 429/306; 429/307; 429/310; 429/311; 429/312; 429/314; 429/317; 429/324

(58) Field of Classification Search
USPC ......... 429/188, 304, 306, 307, 310, 311, 312, 429/314, 317, 324
See application file for complete search history.

(56) References Cited

U.S. PATENT DOCUMENTS

| | | | |
|---|---|---|---|
| 6,022,643 A | 2/2000 | Lee et al. | |
| 6,074,776 A * | 6/2000 | Mao et al. | 429/61 |
| 7,846,584 B2 | 12/2010 | Choi et al. | |
| 2004/0013944 A1 | 1/2004 | Lee et al. | |
| 2004/0086757 A1 | 5/2004 | Mohapatra | |
| 2004/0142246 A1 | 7/2004 | Han et al. | |
| 2004/0262559 A1 | 12/2004 | Shibata | |
| 2006/0188783 A1 * | 8/2006 | Choi et al. | 429/232 |
| 2007/0026318 A1 | 2/2007 | Kishi et al. | |
| 2007/0176151 A1 | 8/2007 | Chen et al. | |
| 2008/0142033 A1 | 6/2008 | Sabbagh et al. | |
| 2009/0021894 A1 | 1/2009 | Ning et al. | |

FOREIGN PATENT DOCUMENTS

| | | |
|---|---|---|
| CN | 1045966 C | 10/1999 |
| EP | 1 172 878 A2 | 1/2002 |
| EP | 1 172 878 A3 | 5/2005 |
| EP | 1 920 755 A1 | 5/2008 |
| JP | 08-007921 | 1/1996 |
| JP | 2000-036608 | 2/2000 |
| JP | 2000-100487 | 4/2000 |
| JP | 2000-215911 | 8/2000 |
| JP | 2002-280061 | 9/2002 |
| JP | 2004-171981 | 6/2004 |
| JP | 2005-014701 | 1/2005 |
| JP | 2007-035413 | 2/2007 |
| JP | 2007-048545 | 2/2007 |
| JP | 2007-121280 | 5/2007 |
| JP | 2008-123714 | 5/2008 |
| JP | 2008-198542 | 8/2008 |
| KR | 10-2005-0014701 | 2/2005 |
| WO | WO 2004/106349 A1 | 12/2004 |
| WO | WO 2005/029632 A1 | 3/2005 |
| WO | WO 2007/091656 A1 | 8/2007 |

OTHER PUBLICATIONS

Abstract CN 1165826 Publication date Nov. 26, 1997.
U.S. Appl. No. 12/775,997, filed May 7, 2010, Dong-joon Lee et al., Samsung SDI Co., Ltd.

* cited by examiner

*Primary Examiner* — Edward Cain
(74) *Attorney, Agent, or Firm* — Lee & Morse, P.C.

(57) ABSTRACT

An organic electrolytic solution including a lithium salt, an organic solvent, and a linear or cyclic polymerizable monomer that is negatively charged due to localization of electrons on the monomer, and a lithium battery employing the same. Since the organic electrolytic solution prevents decomposition of an electrolyte and elution from or precipitation of metal ions, the lithium battery employing the organic electrolytic solution has excellent lifetime characteristics and cycle characteristics.

9 Claims, 2 Drawing Sheets

ELECTROLYTIC SOLUTION AND LITHIUM BATTERY EMPLOYING THE SAME

CROSS-REFERENCE TO RELATED APPLICATION

This application claims the benefit of Korean Patent Application No. 10-2009-0040295, filed May 8, 2009 in the Korean Intellectual Property Office, the disclosure of which is incorporated herein by reference.

BACKGROUND

1. Field

One or more embodiments of the present invention relate to an organic electrolytic solution and a lithium battery employing the same.

2. Description of the Related Art

As portable electronic devices become lighter and have increasingly high performance, batteries used therein are required to have high capacity and high output power. In order to manufacture a battery having high capacity, an active material having high capacity or a high charging voltage of the battery is used.

Metals or alloys are mainly used as high-capacity active materials, and thus the volume of the active material varies significantly during charging and discharging of batteries containing such active materials.

In a battery charged with high voltage, stability of a cathode active material is reduced, and decomposition of an electrolyte solution increases. If a battery charged with high voltage is stored at high temperature, discharge capacity decreases.

SUMMARY

One or more embodiments of the present invention include an organic electrolytic solution inhibiting decomposition of an electrolytic solution and elution or precipitation of metal ions.

One or more embodiments of the present invention include a lithium battery incorporating the organic electrolytic solution.

According to one or more embodiments of the present invention, an organic electrolytic solution includes a lithium salt, an organic solvent and a linear or cyclic polymerizable monomer that is negatively charged due to the location of electrons on the monomer.

According to one or more embodiments of the present invention a lithium battery includes a cathode, an anode, and an organic electrolytic solution, where the organic electrolytic solution includes a lithium salt, an organic solvent and a polymer of a linear or cyclic polymerizable monomer that is negatively charged due to the positions of electrons on the monomer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures

An organic electrolytic solution according to an embodiment of the present invention includes a lithium salt, an organic solvent and a linear or cyclic polymerizable monomer that is negatively charged due to localization of electrons on the monomer. The polymerizable monomer may include compounds represented by Formulae 1 to 5 below:

Formula 1

Formula 2

Formula 3

Formula 4

Formula 5

In Formulae 1 to 5, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$, $R_{25}$, $R_{26}$, $R_{27}$, $R_{28}$, $R_{29}$, $R_{30}$ and $R_{31}$, which may be the same or different, are each independently a hydrogen atom, a nitro group, an amino group, a hydroxyl group, a halogen atom, a cyano group, a carboxyl group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_2$-$C_{20}$ alkoxycarbonyl group, a substituted or unsubstituted $C_6$-$C_{30}$ aryl group, a substituted or unsubstituted $C_1$-$C_{20}$ heteroalkyl group, a substituted or unsubstituted $C_3$-$C_{20}$ heteroaryl group, a substituted or unsubstituted $C_2$-$C_{20}$ alkylcarbonyl group, a substituted or unsubstituted $C_7$-$C_{30}$ arylcarbonyl group, or a substituted or unsubstituted $C_4$-$C_{30}$ heteroarylcarbonyl group.

The substituents that are used in the present embodiment may be defined as follows. The term "alkyl" indicates a saturated, monovalent, straight or branched hydrocarbon group having about 1-20 carbon atoms, for example, about 1-10 carbon atoms, or about 1-6 carbon atoms. The alkyl group may be substituted with at least one halogen substituent. Examples of the alkyl group may include methyl, ethyl, propyl, 2-propyl, n-butyl, isobutyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

The term "aryl" indicates a monovalent, monocyclic, bicyclic, or tricyclic aromatic hydrocarbon group having 6-30 carbon atoms, for example, 6-18 carbon atoms. The aryl group may be substituted with at least one halogen substituent.

The term "alkenyl" indicates a straight or branched unsaturated hydrocarbon chain radical having one or more carbon-carbon double bonds therein and 2-20 carbon atoms, for example, 2-10 carbon atoms, or 2-6 carbon atoms. The alkenyl group binds to residual binding sites via a single bond or a double bond. Examples of the alkenyl group include ethyl, prop-1-enyl, but-1-enyl, pent-1-enyl, penta-1,4-dienyl, etc.

The term "alkynyl" indicates a straight or branched unsaturated hydrocarbon chain radical having one or more carbon-carbon triple bonds and 2-20 carbon atoms, and for example, 2-10 carbon atoms, or 2-6 carbon atoms. The alkynyl group may bind to the residual binding sites via a single bond or a triple bond. Examples of the alkynyl group include ethynyl, prop-1-ynyl, but-1-ynyl, pent-1-ynyl, pent-3-enyl, etc.

The term "alkoxy" indicates an alkyl group bound to oxygen through a single bond and the oxygen in turn bonded through a single bond to another moiety.

The term "heteroalkyl" indicates an alkyl group, wherein at least one carbon atom in the backbone of the alkyl group is substituted with a hetero atom such as nitrogen, sulfur, oxygen, or phosphorus.

The term "heteroaryl" indicates an aryl group, wherein at least one carbon in the ring of the aryl group is substituted with a hetero atom such as nitrogen, sulfur, oxygen, or phosphorus.

In the polymerizable monomer according to the present embodiment, some moieties are negatively charged due to localization of electrons on the monomer. Since the polymerizable monomer has a polymerizable unsaturated bond, it easily forms a polymer. The moieties that are negatively charged are coordinated with positive charges at the surface of the cathode to be adsorbed to the surface of the cathode, thereby forming a film, for example, a surface layer, during charging and discharging. Thus, even a small amount of the polymerizable monomer may efficiently form the film since the polymerizable monomer is distributed along the peripheral portions of the cathode and forms the film. Since the film is formed of the polymer, the film may have a rigid and dense structure.

Since the film is formed on the surface of the cathode, decomposition of the organic solvent otherwise occurring on the surface of the cathode may be suppressed. The lifetime of a battery employing the organic electrolytic solution may be lengthened due to the suppression of the decomposition of the organic solvent. In addition, increase in resistance of the battery may be inhibited since the film prevents the metal ions from being eluted from or precipitated onto the cathode at high temperature.

In addition, the polymerizable monomer or the polymer formed of the same may form a part of a solid electrolyte interface (SEI) on the surface of the electrode during the initial charging and discharging. Accordingly, the polymerizable monomer or the polymer changes the composition of the SEI film that normally includes only a polar organic solvent, and thus the SEI film including the polymerizable monomer or the polymer may have rigid properties after many cycles of charging and discharging. The rigid modified SEI film may efficiently prevent the organic solvent in which the lithium ions are dissolved from penetrating into the cathode during the intercalation of lithium ions. Thus, the SEI film may efficiently block direct contact of the organic solvent and the cathode. As a result, reversible charging and discharging may be performed for many cycles.

The compound represented by Formula 1 may be N-α-acetylglycinamide represented by Formula 6 below, the compound represented by Formula 2 may be 2-acetylthiophene represented by Formula 7 below, the compound represented by Formula 3 may be 3,4-epoxy tetrahydrothiophene-1,1-dioxide represented by Formula 8 below, the compound represented by Formula 4 may be diethyl allylphosphonate represented by Formula 9 below, and the compound represented by Formula 5 may be vinyl prop-2-ene-1-sulfonate represented by Formula 10 below:

Formula 6

Formula 7

Formula 8

Formula 9

Formula 10

In the polymerizable monomer according to the present embodiment, the amount of the compounds represented by Formulae 1 through 10 may be in the range of about 0.01 to about 10 parts by weight, for example, about 0.01 to about 3 parts by weight, based on 100 parts by weight of the organic solvent. This concentration range is suitable for achieving the desired properties of the organic electrolytic solution according to the current embodiment.

The organic solvent used in the organic electrolytic solution may be a nonaqueous organic solvent that functions as a medium through which ions participate in an electrochemical reaction of a battery. Examples of the nonaqueous organic solvent may include carbonates, esters, ethers, alcohols, and non-protonic solvents. Examples of the carbonates may include dimethyl carbonate (DMC), diethyl carbonate (DEC), dipropyl carbonate (DPC), methylpropyl carbonate (MPC), ethylpropyl carbonate (EPC), ethyl methyl carbonate (methyl ethyl carbonate, MEC or EMC), ethylene carbonate (EC), propylene carbonate (PC), butylene carbonate (BC), and the like. Examples of the esters may include methyl acetate, ethyl acetate, n-propyl acetate, dimethyl acetate, methyl propionate, ethyl propionate, γ-butyrolactone, 5-decanolide, γ-valerolactone, dl-mevalonolactone, γ-caprolactone, and the like. Examples of the ethers may include dibutyl ether, tetraglyme, diglyme, dimethoxyethane, 2-methyltetrahydrofuran, tetrahydrofuran, and the like. Examples of the ketones may include cyclohexanone and the like. Examples of the alcohols may include ethyl alcohol, isopropyl alcohol, and the like. Examples of the non-protonic solvents may include nitrils, such as R—CN (where R is a straight, branched or cyclic $C_2$-$C_{20}$ hydrocarbon group, which may have a double-bonded aromatic ring or an ether bond); amides, such as dimethylformamide; dioxolanes, such as 1,3-dioxolane; sulfolanes, and the like.

The nonaqueous organic solvents above may be used alone. Alternatively, a plurality of the nonaqueous organic solvents above may be used in a combination thereof. In this case, the mixing ratio of the plurality of the nonaqueous organic solvents may be chosen according to the desired performance of the battery.

The lithium salt used in the organic electrolytic solution is dissolved in the organic solvent and functions as a source of lithium ions in the battery, enabling the basic operation of the lithium battery. In addition, the lithium salt facilitates the migration of lithium ions between the cathode and the anode. Examples of the lithium salt may include at least one supporting electrolyte salt selected from the group consisting of $LiPF_6$, $LiBF_4$, $LiSbF_6$, $LiAsF_6$, $LiN(SO_2C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (LiBOB or lithium bis(oxalato) borate). The concentration of the lithium salt may be in a range of about 0.1 to about 2.0 M. If the concentration of the lithium salt is within the above range, the organic electrolytic solution may have appropriate conductivity and viscosity, allowing lithium ions to migrate effectively.

A lithium battery according to another embodiment of the present invention includes a cathode, an anode and the organic electrolytic solution described above. The organic electrolytic solution includes a lithium salt, an organic solvent and a polymer of a linear or cyclic polymerizable monomer that is negatively charged due to localization of electrons on the monomer. The polymerizable monomer may include the compounds represented by Formulae 1 to 10 above, and the polymer is formed from the polymerizable monomer. The type of the lithium battery is not limited, and may be, for example, a lithium secondary battery, such as a lithium ion battery, a lithium ion polymer battery, a lithium sulfur battery, or the like; or a lithium primary battery.

The lithium battery may be manufactured as follows. The cathode includes a current collector and a cathode active material layer formed on the current collector. First, a cathode active material, a conducting agent, a binder and a solvent are mixed to prepare a cathode active material composition. The cathode active material composition is directly coated on an aluminum (Al) current collector and dried to prepare a cathode plate. Alternatively, the cathode active material composition is cast on a separate substrate and the film obtained therefrom is laminated on an Al current collector to prepare a cathode plate. The method of manufacturing the cathode is known in the art, and thus a detailed description thereof will not be provided. The solvent may be N-methylpyrrolidone (NMP), acetone, water, or the like, without limitation.

A compound (lithiated intercalation compound) which allows reversible intercalation and deintercalation of lithium may be used as the cathode active material for forming the cathode active material layer. In particular, the cathode active material may include at least one composite oxide of lithium and a metal selected from the group consisting of cobalt, manganese, and nickel, and combinations thereof. Examples of the cathode active material may include compounds represented by the following formulae.

$Li_aA_{1-b}X_bD_2$ (where $0.95 \le a \le 1.1$, and $0 \le b \le 0.5$); $Li_aE_{1-b}X_bO_{2-c}D_c$ (where $0.95 \le a \le 1.1$, $0 \le b \le 0.5$, and $0 \le c \le 0.05$); $Li E_{2-b}X_bO_{4-c}D_c$ (where $0 \le b \le 0.5$, and $0 \le c \le 0.05$); $Li_aNi_{1-b-c}Co_bBcD_\alpha$ (where $0.95 \le a \le 1.1$, $0 \le b \le 0.5$, $0 \le c \le 0.05$, and $0 < \alpha < 2$); $Li_aNi_{1-b-c}Co_bX_cO_{2-\alpha M\alpha}$ (where $0.95 \le a \le 1.1$, $0 \le b \le 0.5$, $0 \le c \le 0.05$, and $0 < \alpha < 2$); $Li_aNi_{1-b-c}Co_bX_cO_{2-\alpha}M_2$ (where $0.95 \le a \le 1.1$, $0 \le b \le 0.5$, $0 \le c \le 0.05$, and $0 < \alpha < 2$); $Li_aNi_{1-b-c}Mn_bX_cD_\alpha$ (where $0.95 \le a \le 1.1$, $0 \le b \le 0.5$, $0 \le c \le 0.05$, and $0 < \alpha < 2$); $Li_aNi_{1-b-c}Mn_bX_cO_{2-\alpha}M_\alpha$ (where $0.95 \le a \le 1.1$, $0 \le b \le 0.5$, $0 \le c \le 0.05$, and $0 < \alpha < 2$); $Li_aNi_{1-b-c}Mn_bX_cO_{2-\alpha}M_2$ (where $0.95 \le a \le 1.1$, $0 \le b \le 0.5$, $0 \le c \le 0.05$, and $0 < \alpha < 2$); $Li_aNi_bE_cG_dO_2$ (where $0.90 \le a \le 1.1$, $0 \le b \le 0.9$, $0 \le c \le 0.5$, and $0.001 \le d \le 0.1$.); $Li_aNi_bCo_cMn_dG_eO_2$ (where $0.90 \le a \le 1.1$, $0 \le b \le 0.9$, $0 \le c \le 0.5$, $0 \le d \le 0.5$, and $0.001 \le e \le 0.1$.); $Li_aNiG_bO_2$ (where $0.90 \le a \le 1.1$, and $0.001 \le b \le 0.1$.); $Li_aCoG_bO_2$ (where $0.90 \le a \le 1.1$, and $0.001 \le b \le 0.1$.); $Li_aMnG_bO_2$ (where $0.90 \le a \le 1.1$, and $0.001 \le b \le 0.1$.); $Li_aMn_2G_bO_4$ (where $0.90 \le a \le 1.1$, and $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3 (0 \le f \le 2)$; $Li_{(3-f)}Fe_2(PO_4)_3 (0 \le f \le 2)$; $LiFePO_4$ In the formulae listed above, A is selected from the group consisting of nickel (Ni), cobalt (Co), manganese (Mn), and a combination thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Co), and combinations thereof.

A surface coating layer (hereinafter, "coating layer") may be formed on these compounds. Alternatively, a mixture of a compound without a coating layer formed thereon and a compound having a coating layer formed thereon, the compounds being selected from the above group, may be used. The coating layer may include at least one compound of a coating element selected from the group consisting of an oxide, hydroxide, oxyhydroxide, oxycarbonate, and hydroxycarbonate of the coating element. The compounds for the coating layer may be amorphous or crystalline. The coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or combinations thereof.

The coating layer may be formed using any method that does not adversely affect the physical properties of the anode active material when a compound of such a coating element is used, for example, a spray coating method, an immersion method, or the like. This is known in the art, and thus a detailed description thereof is not provided.

The binder included in the cathode active material layer functions to strongly bind cathode active material particles together and to a current collector. Specific examples of the binder may include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, and polymers including ethylene oxide (polyethylene oxide or PEO), polyvinylpyrrolidone, polyurethane, polytetrafluoroethylene, polyvinylidene fluoride, polyethylene, polypropylene, styrene-butadiene rubber (SBR), acrylated SBR (styrene acrylate copolymer), epoxy resin, nylon (polyamide), and the like.

The conducting agent included in the cathode active material layer is used to provide conductivity to the cathode. Any electrical conductive material that does not effect a chemical change in batteries may be used. Examples of the conducting agent include carbonaceous materials, such as natural graphite, artificial graphite, carbon black, acetylene black, ketjen black, carbon fibers, and the like; metal-based materials, such as copper, nickel, aluminum, silver, and the like, in powder or fiber form; and conductive materials, including conductive polymers, such as a polyphenylene derivative, and mixtures thereof.

The current collector may be formed of aluminum (Al), but is not limited thereto.

Similarly to the manufacturing of the cathode plate described above, an anode active material, a conductive material, a binder, and a solvent are mixed to prepare an anode active material composition. The anode active material composition is directly coated on a copper current collector to prepare an anode plate. Alternatively, the anode material composition is cast on a separate support, and then an anode active material film delaminated from the support is laminated on the copper current collector to prepare an anode plate. The amounts of the anode active material, the conductive material, the binder, and the solvent are the same as those commonly used in a lithium battery.

The anode active material may be a silicon/carbon complex ($SiO_x$), silicon metal, a silicon thin film, lithium metal, a lithium alloy, a carbonaceous material or graphite. The conducting agent, the binder and the solvent in the anode active material composition are the same as those in the cathode active material composition. If required, a plasticizer may be added to the cathode active material composition and the anode active material composition to form pores inside the electrode plates.

A separator may be disposed between the cathode and the anode according to the type of the lithium battery. The separator used in the lithium battery may be any separator that is commonly used for lithium batteries. In one embodiment, the separator may have low resistance to migration of ions in an electrolyte and have a high electrolyte-retaining ability. Examples of a material used to form the separator include glass fiber, polyester, a fluoropolymer such as polytetrafluoroethylene (PTFE), polyethylene, polypropylene, and a combination thereof, each of which may be a nonwoven fabric or a woven fabric. In particular, a windable separator including polyethylene, polypropylene or the like may be used for a lithium ion battery. A separator that retains a large amount of an organic electrolytic solution may be used for a lithium-ion polymer battery. A method of forming these separators will now be described in more detail.

A polymer resin, a filler and a solvent are mixed to prepare a separator composition. Then, the separator composition may be directly coated on an electrode, and then dried to form a separator film. Alternatively, the separator composition may be cast on a support and then dried to form a separator composition film, and the separator composition film is exfoliated from the support and laminated on an electrode to form a separator film.

The polymer resin is not particularly limited and may be any material that may be used as a binder for an electrode plate. Examples of the polymer resin include vinylidenefluoride/hexafluoropropylene copolymer, polyvinylidenefluoride, polyacrylonitrile, polymethylmethacrylate and mixtures thereof. More preferably, a vinylidenefluoride/hexafluoropropylene copolymer having 8 to 25 wt % of hexafluoropropylene may be used.

The separator may be disposed between the cathode and the anode to form an assembly. The assembly is wound or folded and then sealed in a cylindrical or rectangular battery case. Then, the organic electrolyte solution is injected into the battery case to complete the manufacture of a lithium ion battery. Alternatively, according to an embodiment of the present invention, a plurality of assemblies may be stacked in a multi-cell structure and impregnated with the organic electrolyte solution. The resultant is put into a pouch and hermetically sealed, thereby completing the manufacture of a lithium ion polymer battery.

Figure 1:
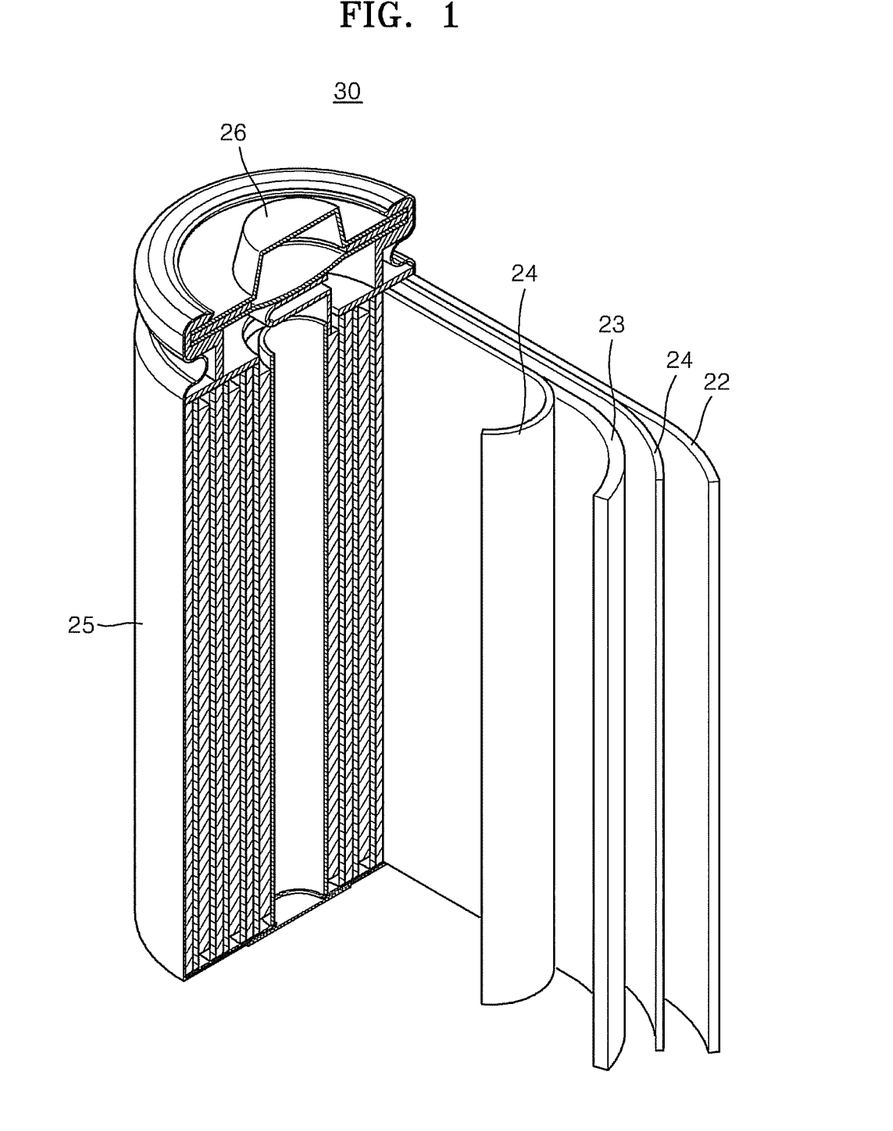
FIG. 1 is a schematic perspective view of a typical structure of a lithium battery according to an embodiment of the present invention.

FIG. 1 is a schematic perspective view of a typical structure of a lithium battery 30 according to an embodiment of the present invention. Referring to FIG. 1, the lithium battery 30 according to the present embodiment includes a cathode 23, an anode 22, a separator 24 disposed between the cathode 23 and the anode 22, and an electrolyte (not shown and bathing the cathode 23), the anode 22 and the separator 24), a case 25, and a sealing member 26 sealing the case 25. The lithium battery 30 is manufactured by sequentially stacking the cathode 23, the anode 22 and the separator 24 upon one another, winding the stacked layers in a spiral form, and inserting the wound stack in the case 25.

Hereinafter, one or more embodiments of the present invention will be described in more detail with reference to the following examples. However, these examples are not intended to limit the scope of the embodiments of the present invention.

Preparation of Electrolytic Solution

Preparation Example 1

0.1 parts by weight of N-α-acetylglycinamide represented by Formula 6 below was added to 100 parts by weight of a mixed organic solvent including 30 volume % of ethylene carbonate, 50 volume % of diethyl carbonate and 20 volume % of ethyl methyl carbonate, and 1.3 M of a lithium salt, LiPF$_6$, was added thereto, thereby manufacturing an organic electrolyte solution.

Formula 6

Preparation Example 2

0.1 parts by weight of 2-acetylthiophene represented by Formula 7 below was added to 100 parts by weight of a mixed organic solvent including 30 volume % of ethylene carbonate, 50 volume % of diethyl carbonate and 20 volume % of ethyl methyl carbonate, and 1.3 M of a lithium salt, LiPF$_6$, was added thereto, thereby manufacturing an organic electrolyte solution.

Formula 7

Preparation Example 3

0.1 parts by weight of 3,4-epoxy tetrahydrothiophene-1,1-dioxide represented by Formula 8 below was added to 100 parts by weight of a mixed organic solvent including 30 volume % of ethylene carbonate, 50 volume % of diethyl carbonate and 20 volume % of ethylmethyl carbonate, and 1.3 M of a lithium salt, LiPF$_6$, was added thereto, thereby manufacturing an organic electrolyte solution.

Formula 8

Preparation Example 4

0.3 parts by weight of diethyl allylphosphonate represented by Formula 9 below was added to 100 parts by weight of a mixed organic solvent including 30 volume % of ethylene carbonate, 50 volume % of diethyl carbonate and 20 volume % of ethyl methyl carbonate, and 1.3 M of a lithium salt, LiPF$_6$, was added thereto, thereby manufacturing an organic electrolyte solution.

Formula 9

Preparation Example 5

0.1 parts by weight of vinyl prop-2-ene-1-sulfonate represented by Formula 10 below was added to 100 parts by weight of a mixed organic solvent including 30 volume % of ethylene carbonate, 50 volume % of diethyl carbonate and 20 volume % of ethyl methyl carbonate, and 1.3 M of a lithium salt, LiPF$_6$, was added thereto, thereby manufacturing an organic electrolyte solution.

Formula 10

Comparative Preparation Example 1

An organic electrolytic solution was prepared in the same manner as in Preparation Example 1, except that N-α-acetylglycinamide was not added thereto.

Manufacture of Lithium Battery

Example 1

2032 standard coin cells were manufactured using a silicon oxide (SiO$_x$) electrode as an anode, a mixture of Li$_{1.167}$ Ni$_{0.2333}$ CO$_{0.1}$ Mn$_{0.4667}$ Mo$_{0.033}$ O$_2$ and LiCoO$_2$ in a weight ratio of 3:7 as a cathode, a CELGARD® (Celgard, LLC) separator membrane, and the organic electrolyte solution prepared according to Preparation Example 1.

A powder including Li$_{1.167}$ Ni$_{0.2333}$ CO$_{0.1}$ Mn$_{0.4667}$ Mo$_{0.033}$ O$_2$ and LiCoO$_2$ in a weight ratio of 3:7, a binder in which 5 weight % of polyvinylidene fluoride (PVdF) was dissolved in N-methylpyrrolidone (NMP), and a conducting agent (SUPER P®, Timcal SA) were mixed in a weight ratio of 94:3:3 in an agate mortar, thereby manufacturing a slurry for a cathode material.

The slurry was cast on a 15 μm aluminum foil using a doctor blade with an interval of 100 μm to obtain a cathode electrode. Then, the cathode electrode was dried in a primary drying process in an oven at 90° C. for about 2 hours so as to evaporate NMP, and the resultant was dried in a secondary drying process in a vacuum oven at 120° C. for about 2 hours to completely evaporate the NMP. Then, the cathode electrode was rolled to have a thickness of 60 μm.

A silicon oxide (SiO) powder and a binder including polyamideimide were mixed in a weight ratio of 90:10 in an agate mortar, thereby manufacturing a slurry for an anode material. The slurry was cast on a 10 μm copper foil using a doctor blade with an interval of 60 μm to obtain an anode electrode. Then, the anode electrode was dried in a drying process in an oven at 90° C. for about 2 hours, and the anode electrode was rolled to have a thickness of 47 p. The anode electrode was cured in a vacuum oven at 200° C. for about 1 hour.

Example 2

A coin cell was manufactured in the same manner as in Example 1, except that the organic electrolytic solution prepared in Preparation Example 2 was used instead of the organic electrolytic solution prepared in Preparation Example 1.

Example 3

A coin cell was manufactured in the same manner as in Example 1, except that the organic electrolytic solution prepared in Preparation Example 3 was used instead of the organic electrolytic solution prepared in Preparation Example 1.

Example 4

A coin cell was manufactured in the same manner as in Example 1, except that the organic electrolytic solution prepared in Preparation Example 4 was used instead of the organic electrolytic solution prepared in Preparation Example 1.

Example 5

A coin cell was manufactured in the same manner as in Example 1, except that the organic electrolytic solution prepared in Preparation Example 5 was used instead of the organic electrolytic solution prepared in Preparation Example 1.

Example 6

A coin cell was prepared in the same manner as in Example 1, except that $Li_2NiO_2$ and $LiCoO_2$ in a weight ratio of 1:9 was used instead of $Li_{1.167}Ni_{0.2333}Co_{0.01}Mn_{0.4667}Mo_{0.033}O_2$ and $LiCoO_2$ in a weight ratio of 3:7 as the cathode.

Example 7

A coin cell was manufactured in the same manner as in Example 6, except that the organic electrolytic solution prepared in Preparation Example 2 was used instead of the organic electrolytic solution prepared in Preparation Example 1.

Example 8

A coin cell was manufactured in the same manner as in Example 6, except that the organic electrolytic solution prepared in Preparation Example 3 was used instead of the organic electrolytic solution prepared in Preparation Example 1.

Example 9

A coin cell was manufactured in the same manner as in Example 6, except that the organic electrolytic solution prepared in Preparation Example 4 was used instead of the organic electrolytic solution prepared in Preparation Example 1.

Example 10

A coin cell was manufactured in the same manner as in Example 6, except that the organic electrolytic solution prepared in Preparation Example 5 was used instead of the organic electrolytic solution prepared in Preparation Example 1.

Comparative Example 1

A coin cell was manufactured in the same manner as in Example 1, except that the organic electrolytic solution prepared in Comparative Preparation Example 1 was used instead of the organic electrolytic solution prepared in Preparation Example 1.

Comparative Example 2

A coin cell was manufactured in the same manner as in Example 6, except that the organic electrolytic solution prepared in Comparative Preparation Example 1 was used instead of the organic electrolytic solution prepared in Preparation Example 1.

Evaluation Example 1

Cycle Characteristics of Battery

Figure 2:
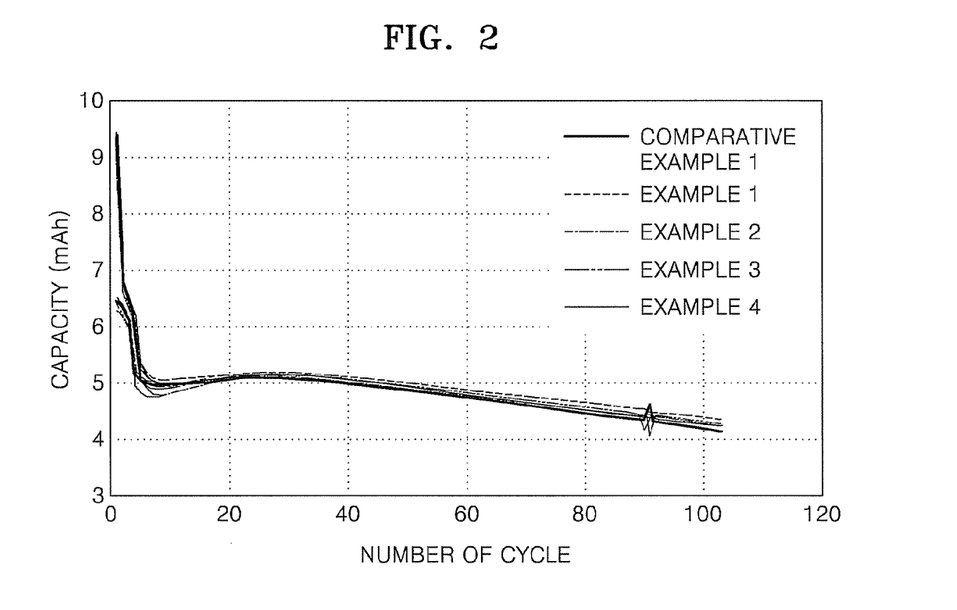
FIG. 2 is a graph illustrating the capacity variation as a function of the number of cycles of lithium batteries prepared according to Comparative Example 1, and Examples 1 to 4.

The coin cells prepared according to Examples 1 to 4 and Comparative Example 1 were charged with a current of 0.05 C until the voltage of the cells reached 4.53 V and discharged with a current of 0.05 C until the voltage of the cells reached 2.5 V in a $1^{st}$ cycle. In a $2^{nd}$ cycle, the cells were charged with a current of 0.1 C until the voltage of the cells reached 4.50 V, charged while maintaining the voltage of 4.5 V until the current reached 0.05 C, and discharged with a current of 0.1 C until the voltage of the cells reached 2.5 V. In a $3^{rd}$ cycle, the cells were charged with a current of 0.5 C until the voltage of the cells reached 4.50 V, charged while maintaining the voltage of 4.5 V until the current reached 0.05 C, and discharged with a current of 0.1 C until the voltage of the cells reached 2.5 V. In the $4^{th}$ to $100^{th}$ cycles, the cells were charged in the same manner as described above, and discharged with a current of 0.8 C until the voltage of the cells reached 2.5 V. The $4^{th}$ or more cycles are referred to as the cycling mode, and the $4^{th}$ cycle is referred to as the $1^{st}$ cycle of the cycling mode. FIG. 2 is a graph illustrating capacity variation of the coin cells prepared according to Comparative Example 1 and Examples 1 to 4. The discharge capacity of the $4^{th}$ cycle is regarded as the standard capacity, and the capacity retention of the $100^{th}$ cycle of the cycling mode is shown in Table 1 below. The capacity retention is defined by Equation 1 below.

$$\text{Capacity retention of } 100^{th} \text{ cycle of cycling mode}[\%] = \text{Discharge capacity of } 100^{th} \text{ cycle of cycling mode/Discharge capacity of } 1^{st} \text{ cycle of cycling mode} \qquad \text{Equation 1}$$

TABLE 1

| Capacity retention of $100^{th}$ cycle of cycling mode (%) | |
|---|---|
| Comparative Example 1 | 79.9 |
| Example 1 | 83.1 |
| Example 2 | 86.3 |
| Example 3 | 81.6 |
| Example 4 | 82.6 |

Referring to Table 1 and FIG. 2, the capacity retention of the coin cells prepared according to Examples 1 to 4 into which compounds of Formulae 6 to 9 were added as additives, according to embodiments of the present invention, is greater than that of the coin cells prepared according to Comparative Example 1.

Figure 3:
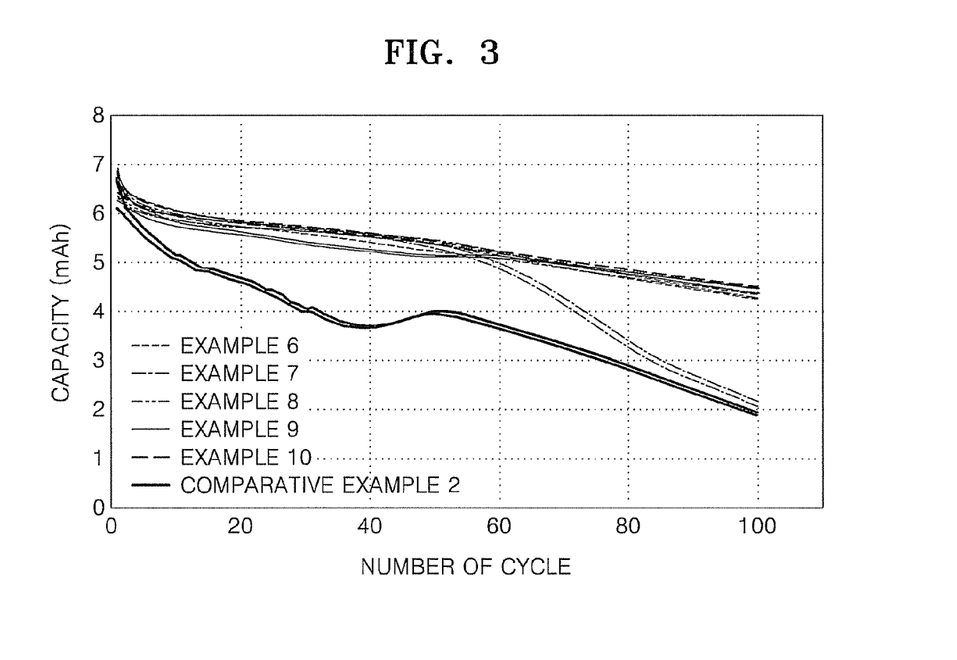
FIG. 3 is a graph illustrating the capacity variation as a function of the number of cycles of lithium batteries prepared according to Comparative Example 2 and Examples 6 to 10 and after being stored at high temperature.

The coin cells prepared according to Examples 6 to 10 and Comparative Example 2 were charged and discharged to the $3^{rd}$ cycle, and the cycling mode of the charged coin cells was tested in an oven at 60° C. The test was repeated until the $100^{th}$ cycle, and the results are shown in Table 2 and FIG. 3. FIG. 3 is a graph illustrating capacity variation of the coin cells prepared according to Comparative Example 2 and Examples 6 to 10 after being stored at high temperature. The capacity retention of the 100$^{th}$ cycle at 60° C. is defined by Equation 2 below.

Capacity retention of 100$^{th}$ cycle at 60° C.[%]= Discharge capacity of 100$^{th}$ cycle at 60° C./Discharge capacity of 1$^{st}$ cycle at 60° C.  Equation 2

TABLE 2

| Capacity retention of 100$^{th}$ cycle at 60° C. (%) | |
| --- | --- |
| Comparative Example 2 | 33.3 |
| Example 6 | 68.9 |
| Example 7 | 34.1 |
| Example 8 | 70.2 |
| Example 9 | 72.8 |
| Example 10 | 72.5 |

As shown in Table 2 and FIG. 3, the capacity retention of the coin cells prepared according to Examples 6 to 10 into which compounds of Formulae 6 to 10 were added as additives, according to embodiments of the present invention, is greater than that of the coin cells prepared according to Comparative Example 1 after being stored at a high temperature.

As described above, according to one or more of the above embodiments of the present invention, a lithium battery employing the organic electrolytic solution has a long lifetime and stability at high temperature.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An organic electrolytic solution comprising:
   a lithium salt;
   an organic solvent; and
   a linear or cyclic polymerizable monomer that is negatively charged due to localization of electrons on the monomer,
   wherein the polymerizable monomer is at least one monomer selected from the group of monomers represented by Formulae 1 to 4 below:

Formula 1

Formula 2

Formula 3

Formula 4 wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, and $R_{23}$, which are the same or different, are each independently selected from the group consisting of a hydrogen atom, a nitro group, an amino group, a hydroxyl group, a halogen atom, a cyano group, a carboxyl group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_2$-$C_{20}$ alkoxycarbonyl group, a substituted or unsubstituted $C_6$-$C_{30}$ aryl group, a substituted or unsubstituted $C_1$-$C_{20}$ heteroalkyl group, a substituted or unsubstituted $C_3$-$C_{20}$ heteroaryl group, a substituted or unsubstituted $C_2$-$C_{20}$ alkylcarbonyl group, a substituted or unsubstituted $C_7$-$C_{30}$ arylcarbonyl group, and a substituted or unsubstituted $C_4$-$C_{30}$ heteroarylcarbonyl group.

2. The organic electrolytic solution of claim 1, wherein the polymerizable monomer is at least one monomer selected from the group of monomers represented by Formulae 6 to 9 below:

Formula 6

Formula 7

Formula 8

Formula 9

3. The organic electrolytic solution of claim 2, wherein the amount of the polymerizable monomer is in the range of about 0.01 to about 10 parts by weight based on 100 parts by weight of the organic solvent.

4. A lithium battery comprising: a cathode; an anode; and an organic electrolytic solution, wherein the organic electrolytic solution comprises a lithium salt; an organic solvent; and a polymer of a linear or cyclic polymerizable monomer that is negatively charged due to localization of electrons on the monomer.

5. The lithium battery of claim 4, wherein the polymerizable monomer is at least one monomer selected from the group of monomers represented by Formulae 1 to 4 below:

Formula 1

Formula 2

Formula 3

Formula 4 wherein $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, and $R_{23}$, which are the same or different, are each independently selected from the group consisting of a hydrogen atom, a nitro group, an amino group, a hydroxyl group, a halogen atom, a cyano group, a carboxyl group, a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ alkoxy group, a substituted or unsubstituted $C_2$-$C_{20}$ alkoxycarbonyl group, a substituted or unsubstituted $C_6$-$C_{30}$ aryl group, a substituted or unsubstituted $C_1$-$C_{20}$ heteroalkyl group, a substituted or unsubstituted $C3$-$C_{20}$ heteroaryl group, a substituted or unsubstituted $C_2$-$C_{20}$ alkylcarbonyl group, a substituted or unsubstituted $C_7$-$C_{30}$ arylcarbonyl group, and a substituted or unsubstituted $C_{30}$ heteroarylcarbonyl group.

6. The lithium battery of claim 4, wherein the polymerizable monomer is at least one monomer selected from the group of the monomers represented by Formulae 6 to 9 below:

Formula 6

Formula 7

Formula 8

Formula 9

7. The lithium battery of claim 4, wherein the amount of the polymer is in the range of about 0.01 to about 10 parts by weight based on 100 parts by weight of the organic solvent.

8. The organic electrolytic solution of claim 3, wherein the amount of the polymerizable monomer is in the range of about 0.01 to about 3 parts by weight based on 100 parts by weight of the organic solvent.

9. The lithium battery of claim 7, wherein the amount of the polymer is in the range of about 0.01 to about 3 parts by weight based on 100 parts by weight of the organic solvent.

* * * * *